United States Patent
Holub et al.

(10) Patent No.: US 9,714,613 B2
(45) Date of Patent: Jul. 25, 2017

(54) THROTTLE ADJUSTMENT DURING DECELERATION FUEL SHUT OFF

(71) Applicant: Ford Global Technologies, LLC, Dearborn, MI (US)

(72) Inventors: Patrick Kevin Holub, Novi, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/822,625

(22) Filed: Aug. 10, 2015

(65) Prior Publication Data

US 2017/0044998 A1 Feb. 16, 2017

(51) Int. Cl.
| F02D 41/00 | (2006.01) |
| F02D 9/02 | (2006.01) |
| F02D 41/12 | (2006.01) |
| F02D 13/02 | (2006.01) |

(52) U.S. Cl.
CPC ........... *F02D 9/02* (2013.01); *F02D 13/0215* (2013.01); *F02D 41/0005* (2013.01); *F02D 41/123* (2013.01); *F02D 41/126* (2013.01); *F02D 2009/022* (2013.01); *F02D 2009/023* (2013.01); *F02D 2009/0213* (2013.01)

(58) Field of Classification Search
CPC ... F02D 41/0005; F02D 41/123; F02D 41/126
USPC ...................................................... 123/325
See application file for complete search history.

(56) References Cited

U.S. PATENT DOCUMENTS

| 5,031,715 A * | 7/1991 | Ogawa ................. B60K 31/047 |
| | | 123/198 DB |
| 5,094,206 A | 3/1992 | Buslepp et al. |
| 5,547,037 A * | 8/1996 | Torii .................... B60K 31/047 |
| | | 180/178 |
| 6,705,686 B2 | 3/2004 | Hilbert |
| 6,857,491 B2 | 2/2005 | Wakashiro et al. |
| 6,945,905 B2 | 9/2005 | Tamai et al. |
| 7,930,087 B2 | 4/2011 | Gibson et al. |
| 9,534,544 B2 * | 1/2017 | Huang ..................... F02D 29/02 |
| 2003/0098185 A1 | 5/2003 | Komeda et al. |
| 2005/0153816 A1 * | 7/2005 | Yoda ..................... F02D 9/1095 |
| | | 477/111 |
| 2006/0037578 A1 | 2/2006 | Nakamura |
| 2006/0241843 A1 * | 10/2006 | Matsuda ................ B60K 28/16 |
| | | 701/85 |
| 2007/0266991 A1 * | 11/2007 | Yoshioka ................ F01N 3/101 |
| | | 123/339.1 |
| 2012/0060479 A1 * | 3/2012 | Tsukamoto .......... F02D 41/0005 |
| | | 60/278 |
| 2015/0275773 A1 * | 10/2015 | Huang .................... F02D 29/02 |
| | | 701/104 |

(Continued)

*Primary Examiner* — Erick Solis
(74) *Attorney, Agent, or Firm* — Julia Voutyras; McCoy Russell LLP

(57) ABSTRACT

Methods and systems are provided for adjusting a throttle during deceleration fuel shut off (DFSO). In one example, a method may comprise controlling a position of a throttle in an air inlet of an engine propelling a vehicle, in relation to vehicle operator commands, and during a deceleration fuel shut off mode, increasing opening of said throttle independently of said operator commands when speed of said vehicle is or is expected to fall below a desired speed or desired speed trajectory.

16 Claims, 5 Drawing Sheets

(56) References Cited

U.S. PATENT DOCUMENTS

2016/0144318 A1* 5/2016 Choi .................. F02D 41/0235
  123/676

* cited by examiner

THROTTLE ADJUSTMENT DURING DECELERATION FUEL SHUT OFF

FIELD

The present description relates generally to methods and systems for controlling a vehicle engine during deceleration fuel shut off mode (DFSO).

BACKGROUND/SUMMARY

During a mode of engine operation commonly known as deceleration fuel shut-off (DFSO), fuel injection to one or more engine cylinders may be interrupted. The DFSO mode is generally initiated when an engine powered vehicle is decelerating, and its engine output control element (throttle valve or accelerator pedal) is positioned for engine idling, i.e. no operator demand for additional engine output. Recovery from the DFSO mode typically occurs, when either the engine rotational speed drops below a predetermined minimum speed near idle, or the engine control element is moved from the idling position to accelerate engine rotation and increase output torque.

The purpose of the DFSO operating mode is to reduce fuel consumption, and provide engine braking that results from frictional drag and negative torque applied to the engine by its load. In engine systems with electronic throttle control (ETC), the position of the throttle is adjusted based on a desired air/fuel ratio. Thus, during DFSO, the throttle is typically adjusted to a closed position since fuel is not being injected to the engine. However, closing the throttle limits airflow through the engine, and increases the braking torque on the engine.

However, the inventors herein have recognized potential issues with such systems. As one example, the braking torque exerted on the engine by closing the throttle may cause the engine speed and/or vehicle speed to decrease by more than a desired rate. Thus, excessive deceleration may occur during DFSO by closing the throttle, thereby shortening the DFSO event with a resultant loss in fuel economy gain. Additionally, when exiting DFSO, there may be a lag in the response of the engine to increases in the driver demanded torque as it may take time for the mass airflow through the intake to increase upon opening of the throttle.

In one example, the issues described above may be addressed by a method for controlling a throttle during deceleration fuel shut off mode. In particular an example method may comprise controlling a position of a throttle in an air inlet of an engine propelling a vehicle, in relation to vehicle operator commands, and during a deceleration fuel shut off mode, increasing opening of said throttle independently of said operator commands when speed of said vehicle is or is expected to fall below a desired speed or desired speed trajectory. The method may in some example further comprise decreasing the throttle opening if the vehicle speed rises above the desired speed or desired speed trajectory during the deceleration fuel shut off mode. Additionally or alternatively, the method may comprise closing the throttle upon initiation of the deceleration fuel shut off mode, and then adjusting the position of the throttle away from a closed position in response to the vehicle speed decreasing below a desired speed.

In another representation, a method may comprise controlling position of a throttle, in an air inlet of an engine propelling a vehicle, in relation to vehicle operator commands, and during a deceleration fuel shut off mode, increasing opening of said throttle independently of said operator commands in response to an indication that a catalyst coupled to an exhaust of said engine will saturate with oxygen during said deceleration fuel shut off mode. In some examples, the catalyst may comprise a three way catalyst containing oxygen storage elements such as ceria. In some examples, the method may further comprise estimating an available storage capacity of the catalyst. The method may additionally or alternatively comprise determining whether the catalyst will store enough oxygen during said deceleration fuel shut of mode to reach the storage capacity or a predetermined percentage thereof. When exiting deceleration fuel shut off mode, the method may additionally comprise not injecting fuel to cylinders of said engine when a mass airflow rate in the engine is greater than a desired mass airflow rate, where the mass airflow rate may be determined based on vehicle operator commands and a desired air/fuel ratio.

In this way, over-braking of an engine during DFSO may be reduced and DFSO prolonged to achieve fuel economy savings. Specifically, by opening a throttle valve during DFSO, a braking torque applied to the engine may be reduced, and a vehicle speed may be more closely aligned with a desired speed profile during DFSO. Further by maintaining the position of the throttle in an open position during DFSO, the responsiveness of the engine to increases in driver demanded torque upon exiting DFSO may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
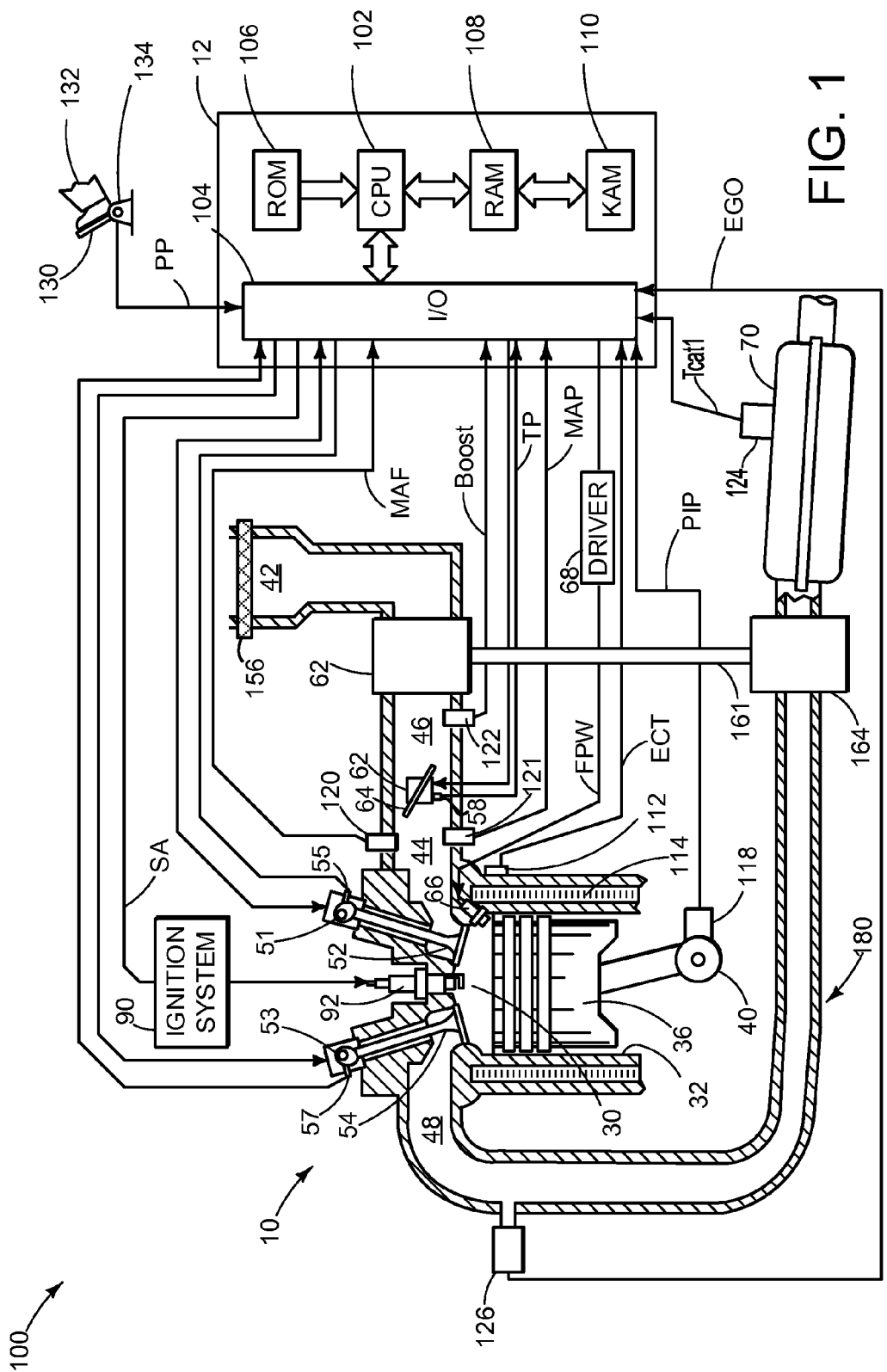
FIG. 1 is a schematic of an example engine system of a four stroke engine.
Figure 2:
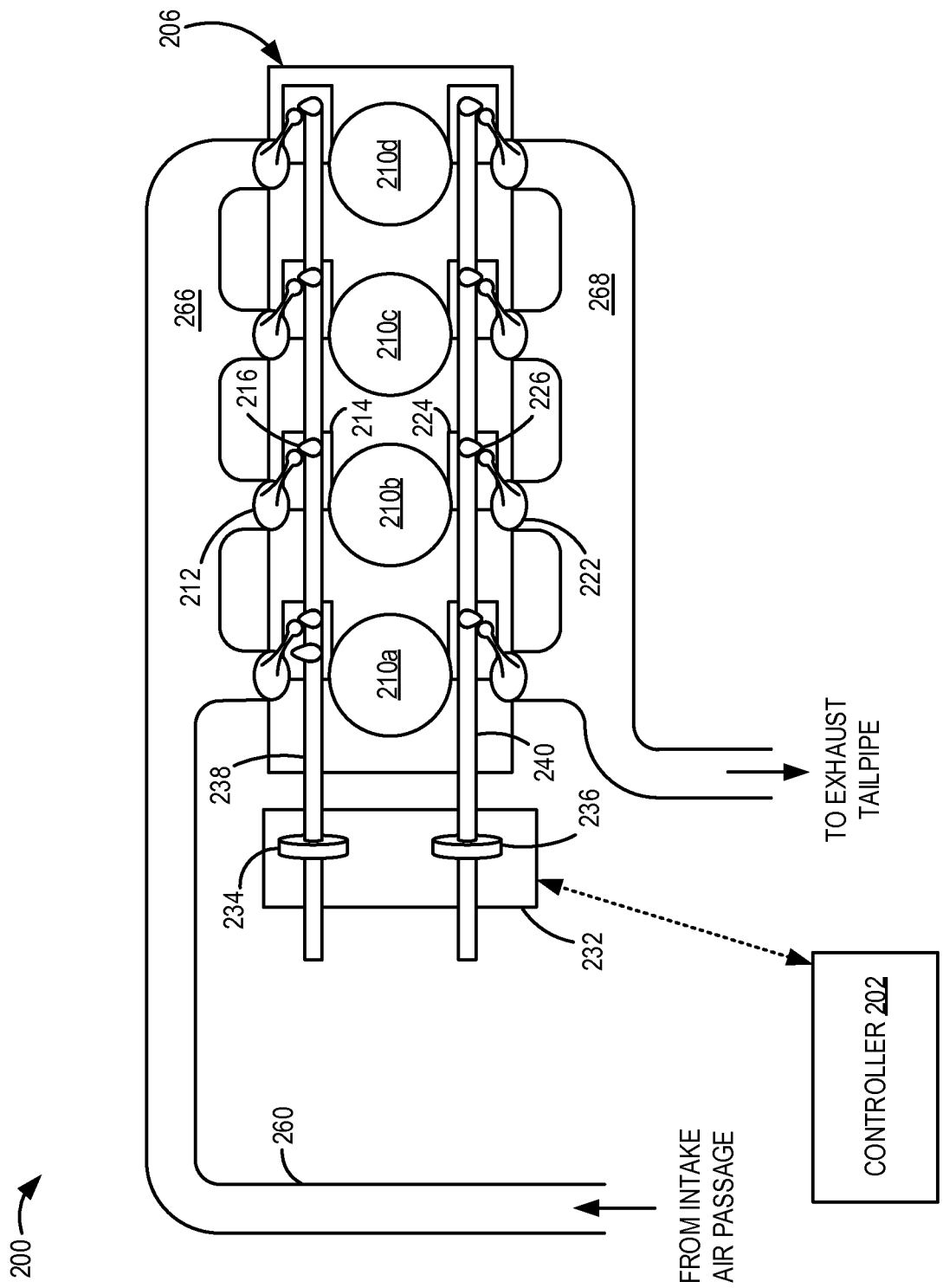
FIG. 2 is a schematic of an example engine system including a variable cam timing (VCT) mechanism for adjusting a position of a camshaft of the engine system.

Systems and methods for adjusting a throttle of an engine are disclosed herein. Example engine systems are shown in FIGS. 1 and 2. Based on input from a vehicle operator, the throttle may be adjusted to regulate a mass airflow rate to one or more engine cylinders to achieve the operator demanded torque. When operator demanded torque falls below a threshold, the engine may enter deceleration fuel shut off (DFSO). During DFSO, the throttle may be adjusted independently of operator commands as described in the method of FIG. 3. Further, when exiting DFSO, the throttle may be temporarily operated independently of operator commands as described in the example method of FIG. 4.

Figure 5:
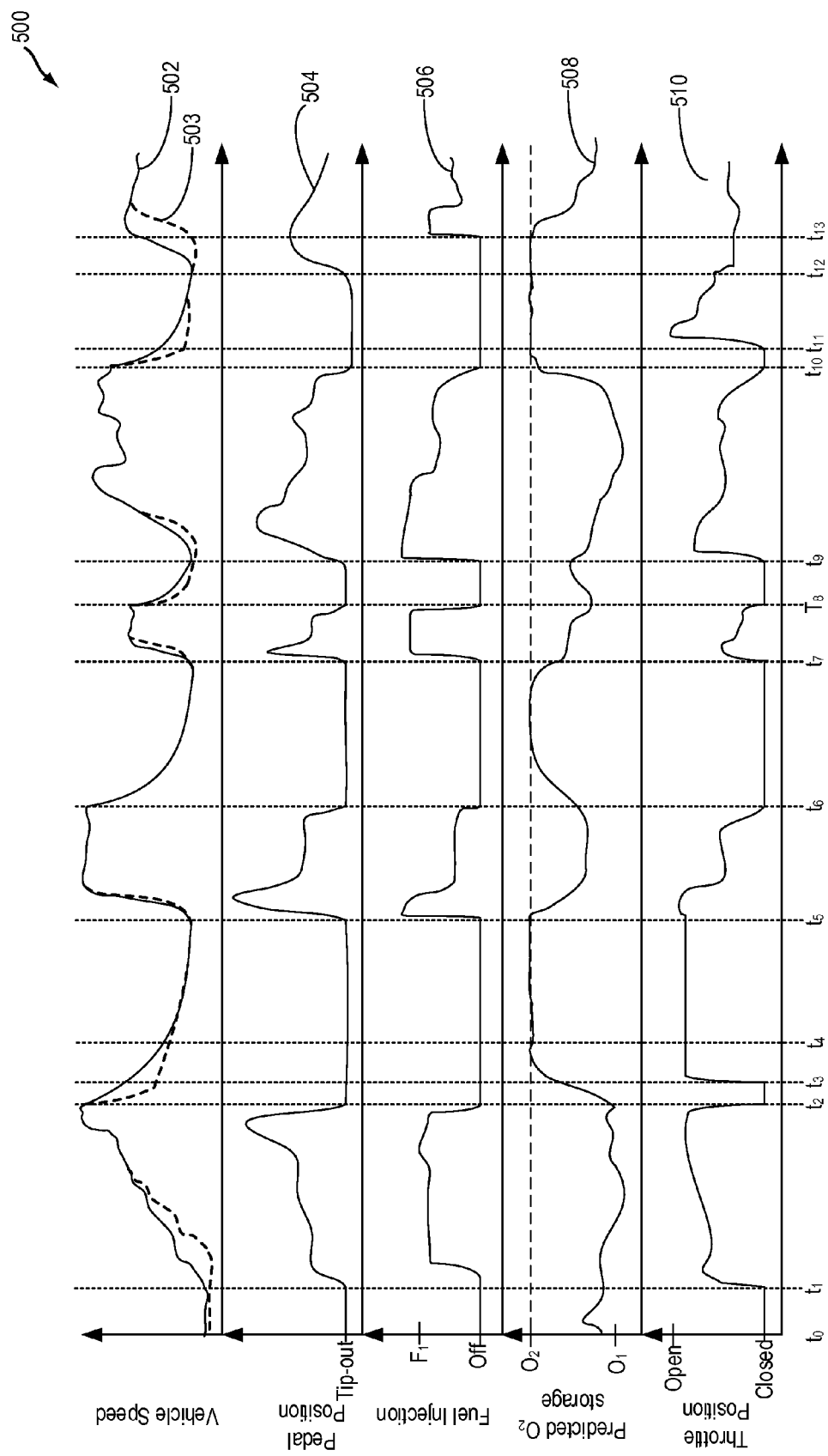
FIG. 5 is a map depicting example throttle operations during varying engine operating conditions.

Example adjusting operation of the throttle during DFSO and during cylinder combustion is shown in FIG. 5.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electro-mechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In addition, intake manifold 44 is shown communicating with electronic throttle 62 which adjusts a position of throttle plate 64 to control airflow to engine cylinder 30. This may include controlling airflow of boosted air from intake boost chamber 46. Electronic throttle 62 may be an electric motor, which is mechanically coupled to the throttle plate 64. As such, electrical input to the throttle 62, may be converted into mechanical rotational motion, which may be used to rotate the position of the throttle plate 64.

The throttle 62 may adjust the position of the throttle plate 64 based on signals received from the controller 12. Thus, based on a desired engine torque, and engine operating conditions, the controller 12 may determine a desired throttle plate 64 position, and send signals to the throttle 62, for adjusting the position of the throttle plate 64 to the desired position.

Ambient air is drawn into combustion chamber 36 via intake passage 42, which may include air filter 56. Thus, air first enters the intake passage 42 through air filter 56. When included, compressor 162 then draws air from air intake passage 42 to supply boost chamber 46 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gasses through turbine 164. Specifically, exhaust gases may spin turbine 164 which may be coupled to compressor 162 via shaft 61.

However, in alternate embodiments, the compressor 162 may be a supercharger, where power to the compressor 162 is drawn from the crankshaft 40. Thus, the compressor 162 may be coupled to the crankshaft 40 via a mechanical linkage, which may be any suitable linkage for mechanically coupling the crankshaft 40 to the compressor 162, such as a belt. As such, a portion of the rotational energy output by the crankshaft 40, may be transferred via the mechanical linkage to the compressor 162 for powering the compressor 162. In still further examples, the engine 10 may not include the compressor 162, and as such the engine 10 may not be a boosted engine.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine. Universal Exhaust Gas Oxygen (UEGO) sensor 126 is shown coupled to exhaust manifold 148 upstream of exhaust catalyst 70. Alternatively, a two-state exhaust gas oxygen sensor may be substituted for UEGO sensor 126. While the depicted example shows UEGO sensor 126 upstream of turbine 164, it will be appreciated that in alternate embodiments, UEGO sensor may be positioned in the exhaust manifold downstream of turbine 164 and upstream of convertor 70.

Catalyst 70 can include multiple catalyst bricks, in one example. In another example, multiple emission control devices, each with multiple bricks, can be used. Exhaust catalyst 70 can be a three-way type catalyst in one example. Thus, catalyst 70 may be configured to reduce nitrogen oxides (NOx), and oxidize carbon monoxide (CO) and unburnt hydrocarbons (HCs) to water and carbon dioxide. The air/fuel ratio entering the engine 10 may be regulated by controller 12 so that the air-fuel ratio is continuously cycled closely about the stoichiometric air-fuel ratio. In some examples, the stoichiometric air-fuel ratio may be an air-fuel ratio of approximately 14.7:1. In this way, the exhaust gas passing over the catalytic surfaces of the catalyst 70 is alternatively rich in oxygen and deficient in oxygen so as to promote the nearly simultaneous oxidation and reduction reactions. The catalyst 70 may be formed as a ceramic monolith with a honeycomb structure. Further, the surfaces of the catalyst 70 may comprise one or more noble metal materials for holding the catalytic materials used in the oxidation and reduction reactions. Suitable elements to be used for retaining the catalytic materials may include aluminum oxide, titanium dioxide, silicon dioxide, and a mixture of silica and alumina can be used. One or more of platinum, palladium, rhodium, cerium, iron, manganese and nickel may be used as catalytic materials in performing the oxidation and reduction reactions of the catalyst 70.

When the engine 10 runs lean, where the air-fuel ratio is greater than stoichiometric, excess oxygen may be stored in the catalyst 70, for later use during conditions where the engine 10 is running rich and the exhaust gasses are oxygen deficient. An oxygen storage material such as ceria ($CeO_2$) may be therefore included in the catalyst 70 for storing oxygen during lean engine operating conditions. Thus, the catalyst 70 may be capable of temporarily storing oxygen during the oxygen-rich portions of the air-fuel cycles so as to provide oxygen for the oxidation reactions when the exhaust gas is momentarily oxygen deficient. However, the catalyst 70 may only be capable of storing up to a threshold amount of oxygen. Thus, the catalyst 70 may be referred to as saturated, when the oxygen storage content of the catalyst 70 has reached the threshold, where substantially no additional oxygen may be stored by the catalyst.

Further, a temperature, $Tcat1$, of the catalyst 70 may be estimated based on outputs from a temperature sensor 124 coupled to the catalyst 70. Thus, the temperature sensor 124 may be physically coupled to the catalyst 70 and may be configured to measure/estimate a temperature of the catalyst. During DFSO, a temperature of the catalyst may decrease as the temperature of exhaust gasses may be reduced. However, in an alternate embodiment, temperature Tcat1 may be inferred from engine operation.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

The controller 12 may determine a desired position of the throttle plate 64 based on one or more of inputs received from the input device 130 and pedal position (PP) signal, a vehicle weight, road incline, transmission gear, etc. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. More specifically, the throttle 62 may be an electric motor, which may be mechanically coupled to the throttle plate 64, for adjusting the position of the throttle plate 64 based on signals received from the controller 12. Thus electrical input to the throttle 62 may be converted to mechanical rotational energy, used to adjust the position of the throttle plate 64, and vary airflow to the engine cylinder 30.

However, during certain operating conditions, such as during coasting or when descending down a hill, the engine 10 may enter a deceleration fuel shut-off (DFSO) mode, where fuel injection to the cylinder 30 may be terminated. In some examples, as is explained in greater detail below with reference to FIGS. 3 and 4, the throttle plate 64 may be adjusted to an open position during DFSO if vehicle speed is, or is expected to fall below a desired trajectory. In other examples, the throttle plate 64 may be adjusted to a more closed position during DFSO, if vehicle speed is, or is expected to not fall below the desired trajectory. In still further examples, the throttle plate 64 may be adjusted to a more open position during DFSO, only if the vehicle speed is, or is expected to fall below a desired trajectory and the exhaust catalyst 70 is predicted to be saturated during the DFSO event.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. Thus, engine 10 may be a four stroke engine. Generally, the piston 36 may move away from top dead center (TDC), towards bottom dead center (BDC) during the intake and expansion strokes. Conversely, during the compression stroke and exhaust stroke, the piston 36 may move away from BDC towards TDC. During the intake stroke, generally, the exhaust valve 54 may close and intake valve 52 may open so that gasses from the engine intake may enter the cylinder 30. In the compressions stroke and expansion stroke, the intake valve 52 may be closed, and the exhaust valve 54 may remain closed. During the exhaust stroke the intake valve 52 may remain closed, and the exhaust valve 54 may be opened. The position of the valves 52 and 54, may be adjusted by a camshaft (not shown in FIG. 1). As described in greater detail below with reference to FIG. 2, the position of the camshaft, and therefore the position of the valves 52 and 54 may be adjusted depending on engine operating conditions. Specifically, the position of the camshaft relative to the crankshaft 40 may be adjusted by adjusting the position of the camshaft.

Crankshaft 40 converts piston movement into a rotational torque of the rotary shaft. During the exhaust stroke, the exhaust valve 54 opens to release the combusted air-fuel mixture to exhaust manifold 48. Exhaust gasses may continue to flow from the exhaust manifold 48, to the turbine 64 via an exhaust passage 80. Further, exhaust gasses may flow past the catalyst 70, before being emitted to the atmosphere. Note that the above is described merely as an example, and that intake and exhaust valve opening and/or closing timings may vary, such as to provide positive or negative valve overlap, late intake valve closing, or various other examples.

FIG. 2 shows an example embodiment of an engine 200 including a controller 202, a variable cam timing (VCT) system 232, and an engine block 206 with a plurality of cylinders 210. Engine 200 may be one example of engine 10 described in FIG. 1. Thus, FIG. 2 shows an example VCT system which may be employed in the engine 10 described in FIG. 1, to adjust the timing of the opening and closing of the intake valve 52 and exhaust valve 54 of engine 10. Engine 200 is shown having an intake manifold 266 configured to supply intake air and/or fuel to the cylinders 210a-d and an exhaust manifold 268 configured to exhaust the combustion products from the cylinders 210. Ambient air flow can enter the intake system through intake air passage 260, wherein the flow rate and/or pressure of the intake air can be controlled at least in part by a main throttle (not shown).

Engine block 206 includes a plurality of cylinders 210a-d (herein four). In the depicted example, all the cylinders are on a common engine bank. In alternate embodiments, the cylinders may be divided between a plurality of banks. For example, cylinders 210a-b may be on a first bank while cylinder 210c-d may be on a second bank. Cylinders 210a-d may each include a spark plug and a fuel injector for delivering fuel directly to the combustion chamber, as described above in FIG. 1. Also, cylinders 210a-d may each be serviced by one or more valves. In the present example, each cylinder 210a-d includes a corresponding intake valve 212 and an exhaust valve 222. As elaborated below, engine 200 further includes one or more camshafts 238, 240 wherein each camshaft can be actuated to operate intake and/or exhaust valves of a plurality of cylinders coupled to a common camshaft.

Each intake valve 212 is actuable between an open position that allows intake air into the corresponding cylinder and a closed position substantially blocking intake air from the cylinder. Further, FIG. 2 shows how intake valves 212 of cylinders 210a-d may be actuated by a common intake camshaft 238. Intake camshaft 238 may be included in intake valve actuation system 214. Intake camshaft 238 includes intake cam lobes 216 which have a lift profile for opening the intake valves 212 for a defined intake duration. In some embodiments (not shown), the camshaft may include additional intake cam lobes with an alternate lift profile that allows the intake valves 212 to be opened for an alternate lift and/or duration (herein also referred to as a cam profile switching system). Based on the lift profile of the additional cam lobe, the alternate duration may be longer or shorter than the defined intake duration of intake cam lobe 216. The lift profile may affect cam lift height, cam duration, opening timing, and/or closing timing. A controller may be able to switch the intake valve duration by moving the intake cam lobes 216 longitudinally and switching between cam profiles. In another embodiment, a controller may be able to switch the intake valve duration by latching or unlatching rocker arms, cam followers, or other mechanisms between cam lobes 216 and intake valves 216.

In the same manner, each exhaust valve 222 is actuable between an open position allowing exhaust gas out of the corresponding cylinder and a closed position substantially retaining gas within the cylinder. Further, FIG. 2 shows how exhaust valves 222 of cylinders 210a-d may be actuated by a common exhaust camshaft 240. Exhaust camshaft 240 may be included in exhaust valve actuation system 224. Exhaust camshaft 240 includes exhaust cam lobes 226 which have a lift profile for opening the exhaust valves 222 for a defined exhaust duration. In some embodiments (not shown), the camshaft may include additional exhaust cam lobes with an alternate lift profile that allows the exhaust valves 222 to be opened for an alternate lift and/or duration. Based on the lift profile of the additional cam lobe, the alternate duration may be longer or shorter than the defined exhaust duration of exhaust cam lobe 226. The lift profile may affect cam lift height, cam duration, opening timing, and/or closing timing. A controller may be able to switch the exhaust valve duration by moving the exhaust cam lobes 226 longitudinally and switching between cam profiles. In another embodiment, a controller may be able to switch the exhaust valve duration by latching or unlatching rocker arms, cam followers, or other mechanisms between cam lobes 226 and exhaust valves 222.

It will be appreciated that while the depicted example shows common intake camshaft 238 coupled to the intake valves of each cylinder 210a-d, and common exhaust camshaft 240 coupled to the exhaust valves of each cylinder 201a-d, in alternate embodiments, the camshafts may be coupled to cylinder subsets, and multiple intake and/or exhaust camshafts may be present. For example, a first intake camshaft may be coupled to the intake valves of a first subset of cylinders (e.g., coupled to cylinders 210a-b) while a second intake camshaft may be coupled to the intake valves of a second subset of cylinders (e.g., coupled to cylinders 210c-d). Likewise, a first exhaust camshaft may be coupled to the exhaust valves of a first subset of cylinders (e.g., coupled to cylinders 210a-b) while a second exhaust camshaft may be coupled to the exhaust valves of a second subset of cylinders (e.g., coupled to cylinders 210c-d). Further still, one or more intake valves and exhaust valves may be coupled to each camshaft. The subset of cylinders coupled to the camshaft may be based on their position along the engine block 206, their firing order, the engine configuration, etc.

Intake valve actuation system 214 and exhaust valve actuation system 224 may further include push rods, rocker arms, tappets, etc. Such devices and features may control actuation of the intake valves 212 and the exhaust valves 222 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210a-d may each have more than one exhaust valve and/or intake valve. In still other examples, each of the exhaust valve 222 and intake valve 212 of one or more cylinders may be actuated by a common camshaft. Further still, in some examples, some of the intake valves 212 and/or exhaust valves 222 may be actuated by their own independent camshaft or other device.

Engine 200 may include variable valve timing systems, for example, variable cam timing VCT system 232. VCT system 232 may be a twin independent variable camshaft timing system, for changing intake valve timing and exhaust valve timing independently of each other. VCT system 232 includes intake camshaft phaser 234 coupled to the common intake camshaft 238 for changing intake valve timing and exhaust camshaft phaser 236 coupled to common exhaust camshaft 240 for changing exhaust valve timing. VCT system 232 may be configured to advance or retard valve timing by advancing or retarding cam timing and may be controlled via signal lines by controller 202. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically actuated, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 232.

In the depicted example, since the intake valves of all the cylinders 210a-d are actuated by a common intake camshaft, a change in the position of the intake camshaft 238 will affect the intake valve position and timing of all the cylinders. Likewise, since the exhaust valves of all the cylinders 210a-d are actuated by a common exhaust camshaft, a change in the position of the exhaust camshaft 240 will affect the exhaust valve position and timing of all the cylinders. For example, a change in position of the intake and/or exhaust camshaft that advances the (intake or exhaust) valve timing of a first cylinder 210a will also advance the (intake or exhaust) valve timing of the remaining cylinders 210b-d at the same time. However, adjustment of the valve timing may be performed on one or more cylinders independent of the valve timing of the remaining cylinders.

As described above, FIG. 2 shows a non-limiting example of an internal combustion engine and associated intake and exhaust systems. It should be understood that in some embodiments, the engine may have more or fewer combustion cylinders, control valves, throttles, and compression devices, among others. Example engines may have cylinders arranged in a "V" configuration. Further, a first common camshaft may control the valves for a first set of cylinders on a first bank while a second camshaft may control the valves for a second set of cylinders on a second bank. That is, a common camshaft of a cam actuation system (e.g., a VCT system) may be used to control valve operation of a group of cylinders.

Thus, FIG. 2 illustrates variable valve timing systems that may be used to adjust the intake valve opening, intake valve closing, exhaust valve opening, and exhaust valve closing events of one or more cylinders of an engine.

In some embodiments, the engine systems described above with respect to FIGS. 1 and 2 provide for a system, comprising an engine including a variable camshaft timing system, a catalyst positioned in an exhaust of the engine, an ETC system with a throttle plate and an actuator for adjusting the position of the throttle plate, and a controller including instructions for adjusting the position of the throttle plate based on operator commands during cylinder combustion, and not adjusting the position of the throttle plate based on operator commands during DFSO where fuel is not being injected to one or more engine cylinders.

Figure 3:
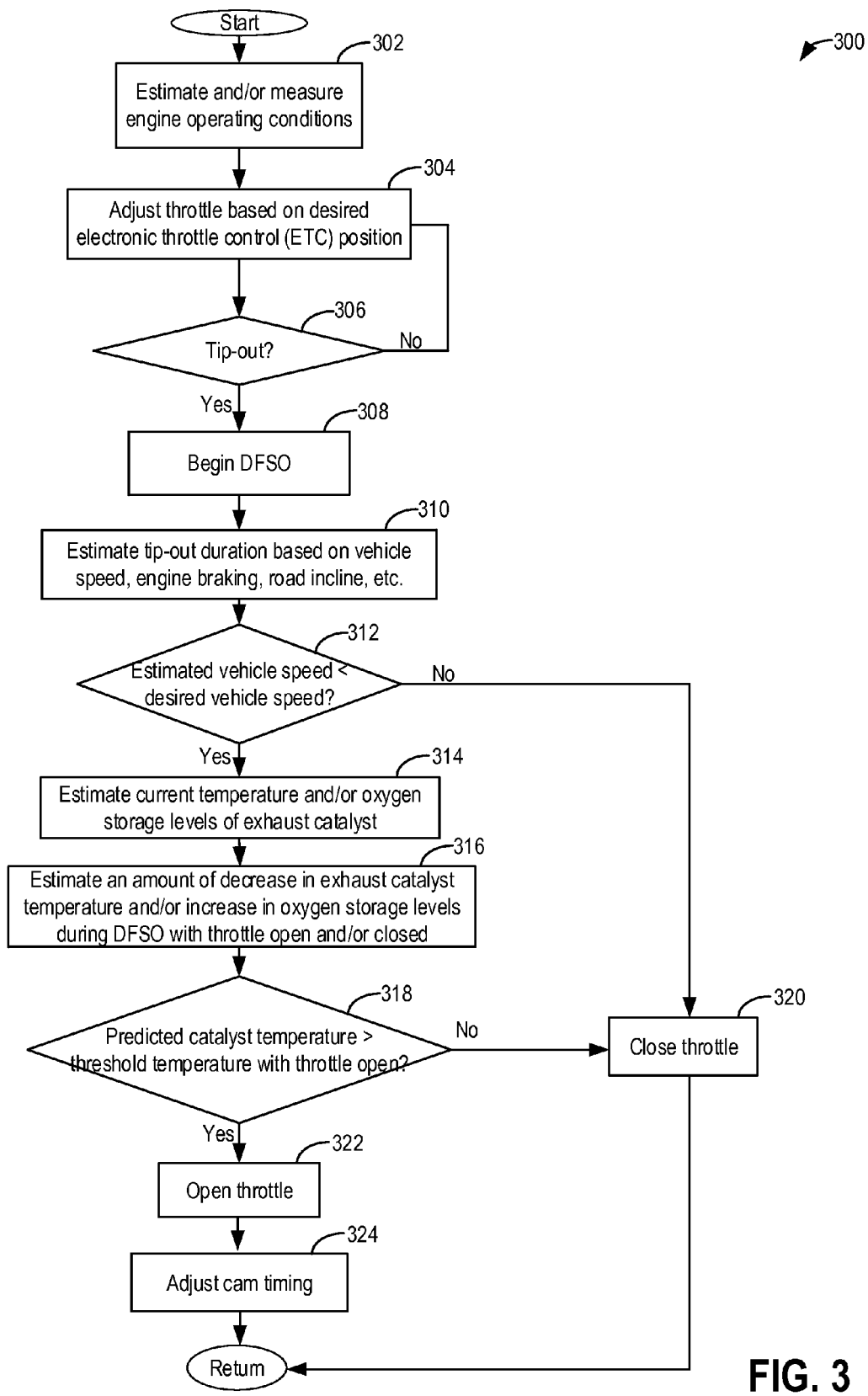
FIG. 3 is a flow chart of an example method for adjusting a throttle of an engine system such as the engine system of FIG. 1.

Turning now to FIG. 3, it shows a flow chart of an example method 300 for adjusting the position of a throttle plate (e.g., throttle plate 64 shown in FIG. 1) before, and while entering a DFSO mode. During engine operation, if a driver demanded torque decreases below a threshold, fuel may not be injected to engine cylinders (e.g., engine cylinder 30 shown in FIG. 1) to reduce fuel consumption. Thus, during DFSO, cylinder combustion may be terminated. In some examples, the throttle plate may be adjusted towards a more closed position, to reduce airflow to the engine cylinders during DFSO. However, closing the throttle plate may exert a braking torque on an engine (e.g., engine 10 shown in FIG. 1) that may cause a vehicle in which the engine is positioned, to decelerate beyond a desired rate. In some examples, therefore, the throttle plate may be adjusted to a more open position during DFSO, to reduce the braking torque on the engine, and thereby reduce the rate at which the vehicle decelerates.

Instructions for carrying out method 300 and the rest of the methods included herein may be executed by a controller (e.g., controller 12 shown in FIG. 1) based on instructions stored on a memory of the controller and in conjunction with signals received from sensor of the engine system, such as the sensors described above with reference to FIG. 1. The controller may employ engine actuators of the engine system to adjust engine operation, according to the methods described below. In particular, the controller may adjust the position of the throttle plate in response to signals received from one or more of a position sensor (e.g., sensor 134 shown in FIG. 1) of an input device (e.g., input device 130 shown in FIG. 1) and instructions stored in the memory of the controller. Specifically, the controller may send signals to an actuator (e.g., throttle 62 shown in FIG. 1) mechanically coupled to the throttle plate, for adjusting the position of the throttle plate. In response to the signals received from the various engine sensors, the controller may determine a desired throttle position and send signals to the actuator of the throttle plate for adjusting the throttle plate to the desired position.

Method 300 begins at 302 which comprises estimating and/or measuring engine operating conditions. Engine operating conditions may include an engine speed, a throttle position as estimated based on outputs from a throttle position sensor (e.g., sensor 58 shown in FIG. 1), an operator commanded torque which may be estimated based on outputs from the position sensor of the input device, an oxygen storage level in an exhaust catalyst (e.g., exhaust catalyst 70 shown in FIG. 1), a fuel injection amount, an intake mass air flow as determined from a mass air flow sensor (e.g., sensor 120 shown in FIG. 1) etc.

After estimating and/or measuring engine operating conditions method 300 may continue to 304 which comprises adjusting the throttle based on a desired electronic throttle control (ETC) position. As described above with reference to FIG. 1, the desired ETC position may be determined based on inputs from a vehicle operator (e.g., vehicle operator 132 shown in FIG. 1) via the input device. In further examples, the desired ETC position may be additionally or alternatively determined based on a vehicle weight, incline at which the vehicle is traveling, etc.

Specifically, the throttle may be adjusted between a fully closed first position and a fully open second position, where substantially no air may flow past the throttle to the engine cylinder when the throttle is in the closed first position. Airflow past the throttle may increase with increasing deflection of the throttle away from the closed first position towards the open second position. Further, an opening formed between the throttle and an intake passage (e.g., intake passage 42 shown in FIG. 1) may increase with increasing deflection away from the closed first position to the open second position.

The throttle may be continuously variable, and may be adjusted to any position between the closed first position and the open second position. Further, the controller may adjust the position of the throttle by sending signals to the actuator of the throttle for adjusting the throttle plate. Specifically, a pulse width modulated (PWM) signal may be communicated to the actuator. In one example, the PWM signal may be at a frequency of 10 Hz. In another example, the throttle plate actuator may receive a PWM signal of 20 Hz.

The desired ETC position may deflect away from the closed first position towards open second position, with increasing depression of the input device. Thus, as the vehicle operator depresses the input device (e.g., accelerator pedal) the position of the throttle may be adjusted to a more open position. Thus, based on the operator commanded torque, which may be estimated based on outputs from the position sensor configured to measure the position of the input device, the controller may determine the ETC position and send signals to the actuator of the throttle plate, for adjusting the throttle plate to the desired ETC position.

Method 300 may then continue to 306 which comprises determining if a tip-out event has occurred. Determining if a tip-out event has occurred may comprise determining if the position of the input device past a threshold first position. In some examples, the first position may be a position of the input device where the input device is not depressed. Thus, the method at 306, may comprise determining if the operator commanded torque is below a threshold. If the input device is depressed, and thus the operator commanded torque is not below the threshold at 306, then method 300 may return to 304 and continue to adjust the throttle position based on the desired ETC position. However, if a tip-out is detected, where the input device may not be depressed, and thus the operator commanded torque may be less than the threshold, then the method may continue to 308 and begin DFSO.

Beginning DFSO may comprise turning off fuel injection. Thus, one or more fuel injectors (e.g., fuel injector 66 shown in FIG. 1) may be turned off, so that fuel is not injected into one or more engine cylinders. As such, the method at 308 may comprise deactivating cylinder combustion, and terminating fuel injection. In some examples, the method at 308 may additionally comprise closing the throttle. Thus, in some examples, the throttle may be closed when commencing DFSO.

Method 300 may then continue to 310 which comprises estimating the tip-out duration based on one or more of vehicle speed, engine braking, road inline, and other factors. For example, the duration of the tip-out event, and therefore DFSO may increase with increasing angles of decline in the road. Further, for increases in the initial vehicle speed at which the tip-out event commenced, the duration of the tip-out event may increase. Other factors may include the presence of traffic signals and/or stopped vehicles in the road ahead, based on information from maps, from vehicle-to-vehicle or infrastructure-to-vehicle communication, and/or from on-board sensors such as camera, radar, etc.

After estimating the duration of the tip-out event at 310, method 300 may continue to 312, which comprises determining if estimated vehicle speed is, or is predicted/anticipated to fall below a desired vehicle speed. Vehicle speed may be estimated based on one or more sensors in the engine configured to measure vehicle speed, such as a crankshaft position sensor. The desired vehicle speed may be a speed determined based on a lookup table stored in the memory of the controller, and may be a function of the expected tip-out duration. Thus, a set of desired vehicle speed curves or profiles may be stored in the memory of the controller. Said another way, a known relationship between initial vehicle speed upon entering DFSO, expected tip-out duration, and deceleration rate may be stored in the memory of the controller. Based on the known relationship, a desired amount of deceleration in the vehicle speed over a duration may be established. As such, a desired vehicle speed trajectory may be determined for the vehicle upon entering DFSO, based on the initial speed of the vehicle at the commencement of the DFSO event and on the expected tip-out duration.

If the estimated vehicle speed is not below the desired vehicle speed, and/or is not expected to drop below the desired vehicle speed, then method 300 may continue to 320 which comprises closing the throttle. The anticipated vehicle speed may be estimated based on the current vehicle speed and engine operating conditions. For example, the expected vehicle speed may be estimated based on road incline, engine load, throttle position, alternator load, etc. Specifically, the anticipated vehicle speed trajectory may decrease with increases in engine load, alternator load, road incline, closing of the throttle, etc. In some examples, the method 300 at 320, may comprise closing the throttle to the fully closed first position. However, in other examples, the method at 320 may comprise adjusting the position of the throttle plate to a more closed position, but not to the fully closed first position. In still further examples, the method at 320 may comprise maintaining the position of the throttle. Specifically, if the vehicle speed is approximately the same as the desired speed, then the position of the throttle may be maintained at 320. Thus, when the vehicle speed matches and/or is substantially the same as the desired speed, then the method 300 may comprise maintaining the position of the throttle.

However, if the estimated vehicle speed is less than the desired vehicle speed or if the estimated vehicle speed is expected to decrease below the desired vehicle speed, then method 300 continues to 314, which may comprise estimating current exhaust catalyst temperature. The temperature of the exhaust catalyst may be estimated based on outputs from an exhaust catalyst temperature sensor (e.g., temperature sensor 124 shown in FIG. 1) coupled to the exhaust catalyst, or based on engine operating conditions such as engine speed, intake mass airflow, air/fuel ratio, spark timing, etc. In another embodiment, the method at 314 may additionally or alternatively comprise estimating current oxygen storage levels of the exhaust catalyst. The oxygen storage levels of the exhaust catalyst may be estimated based on one or more of a temperature of the exhaust catalyst, an air/fuel ratio, an exhaust gas oxygen content, a catalyst age, etc.

After estimating the temperature of the exhaust catalyst and/or oxygen storage levels of the exhaust catalyst, the method 300 may continue to 316 which comprises estimating an amount of decrease in the exhaust catalyst temperature during the DFSO/tip-out event. The temperature of the exhaust catalyst may decrease during DFSO, as the temperature of exhaust gasses may be reduced. Thus, catalyst temperature during the tip-out may be predicted by estimating the current catalyst temperature and estimating an amount of decrease in the catalyst temperature during the DFSO event. Estimating the amount of decrease in catalyst temperature may be determined based on a position of the throttle, estimated mass air flow, initial temperature of the catalyst at the initiation of DFSO, and duration of the DFSO event. The amount of decrease in the catalyst temperature may be greater with the throttle open, than with the throttle closed, since the intake mass airflow may be greater with the throttle open. As such, estimations of the amount of decrease in catalyst temperature during the DFSO event may increase for increases in the degree to which the throttle is opened during the DFSO event. Specifically, in one example, the method at 316 may comprise estimating the amount of decrease in the catalyst temperature during the DFSO event with the throttle closed. In another embodiment, the method at 316 may comprise estimating the amount of decrease in the catalyst temperature during the DFSO event with the throttle open.

In another embodiment, the method at 316 may additionally or alternatively comprise estimating an amount of increase in oxygen storage levels of the exhaust catalyst during DFSO/tip-out event. Since fuel is not injected to the engine during DFSO, the oxygen content of the exhaust catalyst may increase. Estimating the amount of increase in oxygen storage levels of the exhaust catalyst may be determined based on a position of the throttle, estimated mass air flow, oxygen content of the exhaust catalyst, duration of the DFSO event, etc. Thus, the oxygen storage levels of the exhaust catalyst may increase for increases in the duration of the DFSO event, and increases in the mass air flow rate. Thus, by estimating the current oxygen storage levels of the exhaust catalyst, and estimating an amount of increase in the storage levels during the DFSO event, oxygen storage levels in the catalyst may be predicted during the tip-out.

Method 300 may proceed from 316 to 318, which may comprise determining if the predicted temperature of the catalyst will remain above a temperature threshold with the throttle open. The threshold may represent a temperature of the catalyst below which the efficiency of the catalyst is reduced such that emissions increase above a threshold. The efficiency of the catalyst may be reduced at sufficiently low operating temperatures. As such, emission levels may be increased. Opening the throttle during DFSO may exacerbate cooling of the catalyst. However, if it is predicted that the catalyst temperature will remain above the threshold during the DFSO event even if the throttle is kept open, then the throttle may be opened during DFSO to minimize engine braking, without increasing exhaust emission levels.

In another embodiment, the method at 318 may additionally or alternatively comprise determining if the predicted temperature of the catalyst will decrease below the temperature threshold with the throttle closed during the DFSO event. If it is predicted that the catalyst temperature will decrease below the threshold during the DFSO event even if the throttle is kept closed, then the throttle may be opened during DFSO to reduce engine braking, without increasing exhaust emission levels by more than they would be with the throttle closed.

In another embodiment, the method at 318 may additionally or alternatively comprise determining if the predicted oxygen storage levels in the catalyst will exceed an oxygen storage threshold during the DFSO event. The threshold oxygen storage level may represent an oxygen level in the catalyst beyond which the catalyst may be saturated. Thus the oxygen storage threshold at 318, may represent the saturation point of the catalyst, past which substantially no additional oxygen may be stored by the catalyst. However, in other examples, the oxygen storage threshold at 318 may be less than the saturation point of the catalyst.

If it is predicted at 318 that the catalyst temperature will not decrease below the threshold if the throttle is opened, or if the catalyst temperature will decrease below the threshold during the DFSO event even if the throttle is kept closed, method 300 may continue to 322 which comprises opening the throttle. In another embodiment, method 300 may additionally or alternatively continue to 322 if oxygen storage levels in the catalyst are greater than the oxygen storage threshold at 318. However, if it is predicted that the catalyst temperature will remain above the threshold if the throttle is kept closed during the DFSO event, and that the catalyst temperature will decrease below the threshold if the throttle is kept open, then method 300 may continue to 320 and adjust the throttle towards a more closed position. In another embodiment, method 300 may additionally or alternatively continue to 320 if oxygen storage levels in the catalyst do not exceed the oxygen storage threshold at 318.

Opening the throttle at 322 may in some examples comprise opening the throttle to the fully open second position, or to a maximum opening which does not result in operator objectionable induction noise. However, in other examples, opening the throttle may comprise adjusting the position of the throttle to a more open position but not to the fully open second position. Further, in examples where the throttle is opened, but not to the fully open second position, the amount that the throttle is opened may be based on the difference between the estimated vehicle speed and the desired vehicle speed as determined at 312. Thus, if opening the throttle during DFSO will not cause the catalyst temperature to reach the temperature threshold, or if the catalyst temperature will reach the temperature threshold during DFSO with the throttle closed, the throttle may be adjusted away from the fully closed first position towards a more open position. Additionally or alternatively, the throttle may be adjusted away from the fully closed first position towards a more open position if oxygen levels in the catalyst will reach the oxygen storage threshold during the tip-out event. The amount the throttle is opened may be proportional to the amount of difference between the estimated vehicle speed and the desired vehicle speed. As such, for increases in the difference between the estimated vehicle speed and the desired vehicle speed, the amount that the throttle is opened may increase. Thus, during DFSO, if the estimated vehicle speed is or is predicted to fall below the desired speed, and the oxygen catalyst will reach the threshold during the tip-out event, then the position of the throttle may be adjusted independent of input from operator commands via the accelerator pedal (e.g., input device 130 shown in FIG. 1). Said another way, during cylinder combustion, the position of the throttle may be adjusted based on input from the vehicle operator. However, during DFSO, the throttle may be adjusted not based on input from the vehicle operator, but instead based on a difference between a desired vehicle speed and an estimated current and/or predicted vehicle speed.

By increasing the amount the throttle is open, the braking torque exerted on the engine may be reduced. As such, if the estimated vehicle speed decreases below the desired vehicle speed or is predicted to fall below the desired vehicle speed, the throttle valve may be opened to reduce the braking torque on the engine, and therefore reduce an amount of deceleration of the vehicle, so that the difference between the estimated vehicle speed and the desired vehicle speed may be reduced. In this way, during DFSO, excessive engine braking may be reduced, and thus vehicle speed may more accurately be maintained at a desired level.

However, if closing the throttle during DFSO is not predicted to decrease the catalyst temperature below the threshold, but opening the throttle during DFSO is predicted to decrease the catalyst temperature below the threshold, then the throttle may be adjusted to the closed position regardless of the vehicle speed. Opening of the throttle during DFSO may cause the catalyst temperature to decrease below the threshold when it would not have otherwise because the temperature of airflow through the engine during DFSO may be significantly reduced. Said another way, opening the throttle during DFSO may cause more of a decrease in the catalyst temperature than would occur if the throttle were closed. Reducing the catalyst temperature below the threshold may decrease the efficiency of the catalyst, and increase emission levels. Thus, in some examples, the throttle may only be opened during DFSO, if both the vehicle speed is or is expected to fall below the desired speed and either the catalyst temperature is not expected to fall below the threshold if the throttle is opened during, or the catalyst temperature is expected to fall below the threshold even if the throttle is held closed during DFSO. However, in other examples, the throttle may be opened during DFSO so long as the vehicle speed is or is expected to fall below the desired speed. In still further examples, if the catalyst is not predicted to be saturated with oxygen during the tip-out event, then the throttle may be adjusted to the closed position regardless of the vehicle speed. Opening the throttle during DFSO may cause the catalyst to become saturated when it would not have otherwise because airflow through the engine during DFSO has a relatively high oxygen content, as cylinder combustion is deactivated. Saturating the catalyst during DFSO, may result in the engine running rich when exiting DFSO to reduce oxygen levels in the catalyst. Running the engine rich may reduce fuel efficiency. Thus, in some examples, the throttle may only be opened during DFSO, if both the vehicle speed is or is expected to fall below the desired speed and the catalyst is expected to become saturated. In still further examples, the throttle may only be opened during DFSO, if the vehicle speed is or is expected to fall below the desired speed, the catalyst is expected to become saturated, and the catalyst temperature is expected to remain above the threshold with the throttle open.

It should be appreciated that 316 and 318 may be optional steps, and that in some examples, method 300 may be executed without executing 316 and 318. Thus, in some examples, the throttle may be opened during DFSO, so long as the estimated vehicle and/or engine speed is, or is expected to drop below the desired vehicle and/or engine speed. As such, opening of the throttle during DFSO may in some examples be performed independently of catalyst temperature and/or oxygen storage levels in the catalyst. Therefore, adjusting of the throttle during DFSO may in some examples not be based on catalyst temperature and/or oxygen storage levels in the exhaust catalyst. As such, the throttle may be opened during DFSO in response to vehicle and/or engine speed decreasing below the desired speed trajectory, even if the oxygen storage levels are not predicted to exceed the oxygen storage threshold and/or catalyst temperatures are predicted to decrease below the temperature threshold.

After opening the throttle at 322, the method 300 may continue to 324, which comprises adjusting the position of a camshaft (e.g., camshaft 238 shown in FIG. 2) based on one or more of engine speed, throttle position, mass airflow rate in the engine, and the difference between desired vehicle speed and actual or estimated vehicle speed. The mass airflow rate may be estimated based on outputs from a mass airflow sensor (e.g., sensor 120 shown in FIG. 1). Specifically, the intake camshaft may be adjusted when decreased engine braking is desired. In engine systems where one or more intake valves (e.g., intake valve 52 shown in FIG. 1) are closed after a piston (e.g., piston 36 shown in FIG. 1) reaches bottom dead center (BDC), adjusting the intake camshaft timing may comprise retarding the camshaft timing so that the intake valve closing time is retarded. Thus, the intake valve closing time may be adjusted to a later point in the compression stroke where the piston is further away from BDC. By closing the intake valve at a later point in the compression stroke pumping work, and therefore a braking torque exerted on the engine, may be reduced. However, in engine systems where the one or more intake valves are closed before the piston reaches BDC, the adjusting the intake camshaft position may comprise advancing the intake valve closing time, so that the intake valve closes earlier in the intake stroke. Thus, the intake valve closing time may be adjusted so that the intake valve closes at an earlier point in the intake stroke where the piston is further away from BDC. By closing the intake valve at an earlier point in the intake stroke, pumping work, and therefore a braking torque exerted on the engine, may be reduced. Method 300 then returns.

Figure 4:
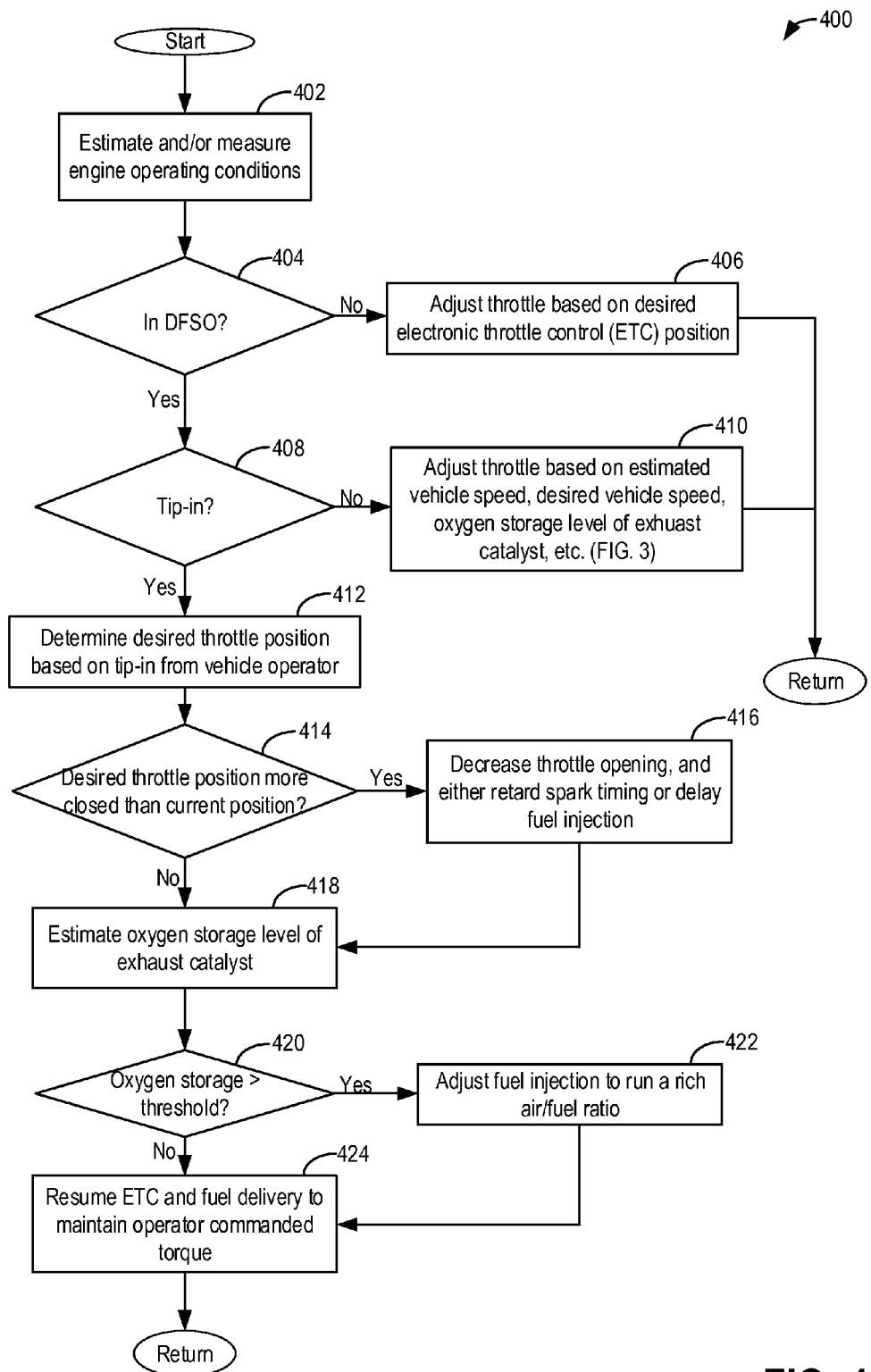
FIG. 4 is a flow chart of an example method for adjusting a throttle of an engine system such as the engine system of FIG. 1 when exiting deceleration fuel shut off.

Turning now to FIG. 4, it shows an example method for adjusting the position of a throttle plate (e.g., throttle plate 64 shown in FIG. 1) when exiting a DFSO mode. In some examples, the throttle plate may be adjusted to a more open position during DFSO, to reduce the braking torque on the engine, and thereby reduce the rate at which the vehicle decelerates as explained above with reference to FIG. 3. Thus, in some examples during DFSO, the adjusting of the throttle may be independent of input from a vehicle operator (e.g., operator 132 shown in FIG. 1). However, when exiting DFSO during a tip-in event, where the operator depresses an accelerator pedal (e.g., input device 130 shown in FIG. 1), adjusting of the throttle becomes dependent on input from the vehicle operator. Specifically, in some examples, during a tip-in event, the increase in engine torque may be sufficiently small so that, the desired ETC position may be a more closed position than the current position of the throttle during DFSO. As such, if fuel injection is turned on and injected in an amount to meet a desired air/fuel ratio with the current airflow through the engine, the delivered engine torque may be greater than the operator commanded torque. Method 400 may be executed to coordinate control schemes for adjusting the throttle during DFSO, and during cylinder combustion.

Method 400 begins at 402 which comprises estimating and/or measuring engine operating conditions. Engine operating conditions may include an engine speed, a throttle position as estimated based on outputs from a throttle position sensor (e.g., sensor 58 shown in FIG. 1), an operator commanded torque which may be estimated based on outputs from the position sensor of the input device, an oxygen storage level in an exhaust catalyst (e.g., exhaust catalyst 70 shown in FIG. 1), a fuel injection amount, an intake mass air flow as determined from a mass air flow sensor (e.g., sensor 120 shown in FIG. 1) etc.

After estimating and/or measuring engine operating conditions at 402, method 400 may continue to 404 which comprises determining if an engine (e.g., engine 10 shown in FIG. 1) is in DFSO. Determining that the engine is in DFSO may comprise determining a tip-out event has occurred in a similar manner as that described above at 306 in FIG. 3. However, in other examples, it may be determined that the engine is in DFSO if fuel is not being injected to one or more engine cylinders (e.g., cylinder 30 shown in FIG. 1) and cylinder combustion is deactivated.

If it is determined that the engine is not in DFSO at 404, then method 400 may continue to 406, which comprises adjusting the position of the throttle based on a desired ETC position in the manner described above with reference to 304 of FIG. 3. Method 400 then returns.

If on the other hand the engine is in DFSO, method 400 may proceed from 404 to 408, where at 408, if may be determined if a tip-in event has occurred. The tip-in event may be a depression of the accelerator pedal by the vehicle operator. However, in other examples, the method at 408 may additionally or alternatively comprise determining if DFSO has been terminated. Determining that deceleration shut off mode has ended may be determined by one or more of the following events: the vehicle has stopped and an idle speed control mode commences, and/or operator demanded torque has increased above a threshold. Thus, the method 400 at 408 may comprise determining if an operator commanded torque has increased. If a tip-in event has not occurred, and the accelerator pedal continue to not be depressed, such that a tip-out event continues, method 400 may continue from 408 to 410, where at 410 the method may comprise adjusting the throttle based on one or more of the estimated vehicle speed, and estimated oxygen storage level of the exhaust catalyst, such as is described between 310-322 of method 300 in FIG. 3. Thus, if the vehicle is not exiting DFSO, then the throttle may be adjusted based on a difference between an estimated vehicle speed and a desired vehicle speed, and a predicted oxygen storage level in the exhaust catalyst as is described in greater detail above with reference to FIG. 3. Thus, in some examples, method 400 at 410 may comprise executing method 300 of FIG. 3. Method 400 then returns.

However, if a tip-in event is detected at 408, and/or the desired torque increases above a threshold, method 400 may proceed to 412 which may comprise determining a desired throttle position based on the tip-in from the vehicle operator. Thus, the method at 408 may comprise determining the desired throttle position based on the amount of depression/deflection of the accelerator pedal. As explained above with reference to FIG. 3, the desired engine torque, and amount of opening of the throttle may increase with increasing deflection/depression of the accelerator pedal.

After determining the desired throttle position at 412, the method 400 may continue to 414 which may comprise determining if the desired throttle position is a more closed position than the current throttle position. The current throttle position may be estimated based on outputs from a throttle position sensor (e.g., sensor 58 shown in FIG. 1). If the desired throttle position is a more closed throttle position than the current throttle position, then method 400 may continue to 416 and decrease the throttle opening. Further, the method at 416 may comprise one or more of retarding spark timing or delaying fuel injection to the one or more engine cylinders, to reduce excessive torque output while the throttle position is being decreased. Thus, the method 400 at 416, may comprise not injecting fuel immediately in response to a tip-in event, but may comprise waiting a duration before injecting fuel if, the desired throttle position is a more closed position than the current throttle position. As such, the throttle position may be adjusted to the desired position at 416, but fuel may not be injected to the engine cylinders. In some examples, the fuel injection may be delayed a set duration. However, in other examples, the duration that fuel injection is delayed may be proportional to the difference in throttle angle between then desired throttle position and the current throttle position, with the duration increasing with increasing differences in throttle angle. In still further examples, the fuel injection may be delayed based on a mass air flow rate.

In other examples, fuel may be injected to engine cylinders in response to termination of DFSO. Thus, fuel injection may not be delayed, and instead may be initiated in response to a tip-in event. In such examples, if the mass airflow rate to the engine cylinders is greater than desired, spark timing may retarded from a set point. In some examples, the set point may be MBT. Thus, the method 400 may comprise initiating fuel injection and cylinder combustion when exiting DFSO, and retarding spark timing if the mass airflow rate is greater than desired when entering DFSO, so that excessive torque output from the engine may be reduced.

The mass airflow rate to the engine cylinders may be estimated by the mass airflow sensor. A desired mass airflow rate may be determined based on the desired throttle position, and a desired air/fuel ratio. Thus, the method 400 at 416, may comprise adjusting the throttle to the desired position, and waiting until the mass airflow rate reaches the desired airflow before injecting fuel to the engine cylinders.

Method 400 may then proceed from 416 to 418 which may comprise estimating oxygen storage levels of the exhaust catalyst. Oxygen storage levels in the exhaust catalyst may be estimated in a similar manner to that previously described at 314 of FIG. 3. Alternatively, method 400 may proceed to 418 if it is determined that the desired throttle position is not more closed than the current throttle position. In some example, the method at 418, may additionally comprise adjusting the throttle to the desired position and injecting fuel based on the throttle angle and a desired air/fuel ratio.

After estimating the oxygen storage levels of the exhaust catalyst at 418, method 400 may continue to 420, which may comprise determining if the oxygen storage levels are greater than a threshold. As described above with reference to 318 of FIG. 3, the threshold may represent oxygen levels in the catalyst at saturation, where substantially no additional oxygen may be stored in the catalyst. However, in other examples, the threshold may be less than the saturation point of the catalyst, but may be sufficiently high so that it may be desired to run a rich air/fuel ratio.

If the oxygen storage levels are greater than the threshold at 420, method 400 may continue to 422 and adjust the fuel injection amount to run a rich air/fuel ratio. Thus, in some examples, the method at 422 may comprise injecting an amount of fuel into the one or more engine cylinders to achieve an air/fuel ratio less than stoichiometric (e.g., 14.7:1). The amount of fuel to be injected at 422 may be estimated based on the desired throttle position, an estimated mass airflow through the engine, and the desired air/fuel ratio. After running the engine rich at 422, method 400 may continue to 424 which may comprise resuming ETC and fuel delivery to maintain operator commanded torque. Alternatively, method 400 may proceed to 424 if it is determined at 420 that oxygen storage levels are below the threshold. Thus, the engine may not be run with a rich air/fuel mixture if the oxygen storage levels are below the threshold.

The method at 424 may therefore comprise adjusting the throttle based on the desired electronic throttle control position which may be based on the operator commanded torque via the accelerator pedal. Further, fuel injection amount may be estimated based on the operator commanded torque, ETC position, and mass air flow through the engine, and a desired air/fuel ratio which may be approximately stoichiometric. Method 400 then returns.

Moving on to FIG. 5, it shows a graph 500 illustrating changes in position of a throttle (e.g., throttle 62 shown in FIG. 1) over time in response to changes in engine operating conditions of an engine system, such as the engine system of FIG. 1. Graph 500 includes an indication of desired vehicle speed at plot 502, and actual estimated vehicle speed at plot 503. The desired vehicle speed may be based on inputs from a vehicle operator (e.g., vehicle operator 132 shown in FIG. 1) via an input device (e.g., input device 130 shown in FIG. 1). During tip-outs, the desired vehicle speed may be determined based on a lookup table stored in the memory of the controller, and may be a function of the expected tip-out duration. Further the graph 500 shows an indication of fuel injection amounts at plot 506, and predicted oxygen storage levels of an exhaust catalyst (e.g., exhaust catalyst 70 shown in FIG. 1) at plot 508. Changes in the position of the throttle are shown at plot 510.

The desired vehicle speed may be estimated by the position of the input device as estimated based on outputs of a position sensor (e.g., sensor 134 shown in FIG. 1) configured to measure a position of the input device. The estimated vehicle speed may be determined by one or more sensor configured to measure vehicle speed such as a wheel speed sensor or transmission output speed sensor. The fuel injection amount may be an amount of fuel commanded to be injected to one or more engine cylinder (e.g., cylinder 30 shown in FIG. 1) by a controller (e.g., controller 12 shown in FIG. 1). The predicted oxygen storage levels of the exhaust catalyst may be estimated based on current oxygen storage levels, and engine operating conditions in a similar manner as described above with reference to 314 and 316 of FIG. 3. The position of the throttle may be adjusted between a fully closed first position and a fully open second position as described above with reference to FIG. 3. The position of the throttle may be estimated by a throttle position sensor (e.g., sensor 58 shown in FIG. 1). Further the position of the throttle may be adjusted by an actuator of the throttle based on signals received from the controller.

Starting at time $t_0$, desired vehicle speed (plot 502) and estimated vehicle speed (plot 503) may be approximately the same and may be at relatively low levels. The pedal position may not be depressed at $t_0$ (plot 504) and therefore a tip-out condition may exist at $t_0$. As such, fuel injection may be off at $t_0$ (plot 506), and the engine may be in DFSO. The predicted oxygen storage level may fluctuate around lower first level O1. Because cylinder combustion is deactivated at $t_0$, the throttle position may be adjusted to the fully closed first position.

Between times $t_0$ and $t_1$, the desired vehicle speed and estimated vehicle speed may be continue to be approximately the same and may continue to fluctuate at relatively low levels. The pedal position may not be depressed and therefore the tip-out condition may persist. As such, fuel injection may continue to be off and the engine may be in DFSO. The predicted oxygen storage level may fluctuate around lower first level O1. Because cylinder combustion is deactivated, the throttle position may be adjusted to the fully closed first position.

However, at time $t_1$, a tip-in event may occur, and a vehicle operator may depress the accelerator pedal. As such, the desired vehicle speed may increase at $t_1$. In response to the increase in operator commanded torque at $t_1$, the throttle may be adjusted to a more open position, and the fuel injection may be turned on. Due to the initiation of cylinder combustion at $t_1$, the predicted oxygen storage levels may begin to decrease.

Between times $t_1$ and $t_2$, the pedal position may continue to be depressed, and as such the vehicle speed may continue to increase. In response to the increase in desired vehicle speed, the throttle position may be held open, and fuel may continue to be injected to the engine cylinders. The position of the throttle and the amount of fuel injected to the engine cylinders may be based on a desired air/fuel ratio, and the desired vehicle speed. The predicted oxygen storage levels may continue to fluctuate around the same levels as at $t_1$, since the engine may alternate back and forth between running slight lean, and slightly rich, to increase oxidation and reduction reactions of pollutants at the catalyst.

At time $t_2$, a tip-out event may occur, and the vehicle operator may stop depressing the accelerator pedal. Thus, the operator commanded torque at $t_2$ may decrease below a threshold, and the engine may enter DFSO. As such, fuel injection may be shut off at $t_2$. Further, the throttle may be adjusted to the closed first position at $t_2$, in response to the initiation of DFSO. Predicted oxygen storage levels may begin to rise at $t_2$, since the vehicle speed at $t_2$ is relatively high. Thus, because the vehicle speed is sufficiently high at $t_2$, it may be predicted that the duration of the DFSO event may be long enough to cause an increase in the oxygen storage levels of the catalyst.

Between times $t_2$ and $t_3$, the desired vehicle speed may continue to decrease. Thus, upon entering DFSO at $t_2$, the desired vehicle speed may be based on a desired speed trajectory which may be stored in the memory of the controller. As such the desired speed between $t_2$ and $t_3$ may be based on a desired deceleration rate during DFSO. However, between $t_2$ and $t_3$, the estimated vehicle speed may decrease faster than the desired speed trajectory. Said another way, the actual vehicle speed may be less than desired. Thus, the engine may be braking more than desired. The predicted oxygen storage levels of the catalyst may continue to increase between $t_2$ and $t_3$. However since the oxygen storage levels have not reach a threshold level, O2, as shown in FIG. 5, the throttle may remain closed between $t_2$ and $t_3$. The threshold level, O2, may represent the saturation point of the catalyst beyond which, substantially no additional oxygen may be absorbed by the catalyst.

At time $t_3$, the predicted oxygen levels may reach the threshold, O2, and in response to the vehicle speed being below the desired vehicle speed at $t_3$, and the predicted oxygen levels reaching the threshold, the throttle may be adjusted to the open second position at $t_3$. Opening the throttle may enable more oxygen to flow through the engine, and therefore the predicted oxygen storage level may remain at approximately the threshold, which may be the saturation point of the catalyst, as long as the throttle is open during DFSO. Thus, opening the throttle during DFSO may saturate the catalyst. Fuel injection may remain off, and the desired vehicle speed may continue to decrease according to the desired speed trajectory during DFSO. The pedal position may remain in a tip-out position.

Between times $t_3$ and $t_4$, the engine may remain in DFSO; the fuel injection may be off, and the pedal position may be in a position that is not depressed. The desired vehicle speed may still remain higher than the estimated vehicle speed, but the difference may decrease due to the opening of the throttle at $t_3$. The predicted oxygen levels may remain at around O2, and the throttle may remain open.

At time $t_4$, due to the throttle opening, the estimated vehicle speed and desired vehicle speed may continue to decrease, and the difference between them may continue to decrease as well. The throttle may be maintained in the open position. Further, the catalyst may remain relatively saturated at $t_4$. The pedal may still remain in the same position as between $t_3$ and $t_4$ and fuel injection may remain off.

Between times $t_4$ and $t_5$, the desired vehicle speed may continue to decrease, as the pedal position continues to remain in a tip-out position, fuel injection remains off, and the engine remains in DFSO. The estimated vehicle speed may begin to match the desired vehicle speed, and as such the position of the throttle may be maintained in relatively the same position as at $t_4$. The oxygen storage levels may continue to be predicted to remain around O2.

At time $t_5$, a tip-in event may occur, similar to at $t_1$. In response to the tip-in event, the desired vehicle speed may increase, and fuel injection may be turned on. Because the throttle is already in the open position at $t_5$, fuel injection may be turned on to a higher level F1, and the vehicle speed may approximately match the desired vehicle speed. At $t_1$, the increase in vehicle speed was delayed from the desired vehicle speed, because it may take time for the airflow through the engine to increase to a rate at which the delivered engine torque matches the desired engine torque. However, since the throttle is in the open position already at $t_5$, airflow through the engine is greater at $t_5$ than at $t_1$. As such, the engine may be quicker to respond to increases in demanded vehicle speed. Predicted oxygen storage levels may decrease at $t_5$, as oxygen levels in the exhaust may decrease due to initiation of cylinder combustion.

Between times $t_5$ and $t_6$, the pedal position may continue to be depressed, and as such the vehicle speed may continue to increase. In response to the increase in desired vehicle speed, the throttle position may be held open, and fuel may continue to be injected to the engine cylinders. The position of the throttle and the amount of fuel injected to the engine cylinders may be based on a desired air/fuel ratio, and the desired vehicle speed. The predicted oxygen storage levels may continue to fluctuate and/or decrease, since the engine may alternate back and forth between running slight lean, and slightly rich, to increase oxidation and reduction reactions of pollutants at the catalyst.

At time $t_6$, a tip-out event may occur, and the vehicle operator may stop depressing the accelerator pedal. Thus, the operator commanded torque at $t_6$ may decrease below a threshold, and the engine may enter DFSO. As such, fuel injection may be shut off at $t_6$. Further, the throttle may be adjusted to the closed first position at $t_6$, in response to the initiation of DFSO. Predicted oxygen storage levels may begin to rise at $t_6$, since the vehicle speed at $t_6$ is relatively high. Thus, because the vehicle speed is sufficiently high at $t_6$, it may be predicted that the duration of the DFSO event may be long enough to cause an increase in the oxygen storage levels of the catalyst.

Between times $t_6$ and $t_7$, the desired vehicle speed may continue to decrease. Thus, upon entering DFSO at $t_6$, the desired vehicle speed may be based on a desired speed trajectory which may be stored in the memory of the controller. As such the desired speed between $t_6$ and $t_7$ may be based on a desired deceleration rate during DFSO. However, between $t_6$ and $t_7$, the estimated vehicle speed may approximately match the desired speed trajectory. Even though the predicted oxygen storage levels of the catalyst may continue to increase between and may reach the threshold, O2, the throttle may remain closed between $t_6$ and $t_7$ since the estimated vehicle speed is substantially the same as the desired vehicle speed. Thus, because the vehicle is not braking more than desired, the throttle may not be opened. Opening of the throttle may result in the vehicle speed exceeding the desired speed, due to decreased braking torque. The pedal position may remain in the tip-out position, and fuel injection may remain off between $t_6$ and $t_7$.

However, at time $t_7$, a tip-in event may occur, and a vehicle operator may depress the accelerator pedal. As such the desired vehicle speed may increase at $t_7$. In response to the increase in operator commanded torque at $t_7$, the throttle may be adjusted to a more open position, and the fuel injection may be turned on. Due to the initiation of cylinder combustion at $t_7$, the predicted oxygen storage levels may begin to decrease.

Between times $t_7$ and $t_8$, the pedal position may continue to be depressed, and as such the vehicle speed may continue to increase. In response to the increase in desired vehicle speed, the throttle position may be held open, and fuel may continue to be injected to the engine cylinders. The position of the throttle and the amount of fuel injected to the engine cylinders may be based on a desired air/fuel ratio, and the desired vehicle speed. The predicted oxygen storage levels may continue to continue to decrease until reaching levels similar to the levels at $t_1$, since the engine may alternate back and forth between running slight lean, and slightly rich, to increase oxidation and reduction reactions of pollutants at the catalyst.

At time $t_8$, a tip-out event may occur, and the vehicle operator may stop depressing the accelerator pedal. Thus, the operator commanded torque at $t_8$ may decrease below a threshold, and the engine may enter DFSO. As such, fuel injection may be shut off at $t_8$. Further, the throttle may be adjusted to the closed first position at $t_8$, in response to the initiation of DFSO. Predicted oxygen storage levels may begin to rise at $t_8$, since the vehicle speed at $t_8$ is relatively high. Thus, because the vehicle speed is sufficiently high at $t_2$, it may be predicted that the duration of the DFSO event may be long enough to cause an increase in the oxygen storage levels of the catalyst.

Between times $t_8$ and $t_9$, the desired vehicle speed may continue to decrease. Thus, upon entering DFSO at $t_8$, the desired vehicle speed may be based on a desired speed trajectory which may be stored in the memory of the controller. As such the desired speed between $t_8$ and $t_9$ may be based on a desired deceleration rate during DFSO. However, between $t_8$ and $t_9$, the estimated vehicle speed may decrease faster than the desired speed trajectory. Said another way, the actual vehicle speed may be less than desired. Thus, the engine may be braking more than desired. The predicted oxygen storage levels of the catalyst may continue to increase between $t_8$ and $t_9$, but may not reach the threshold, O2, during the tip-out event. Because the oxygen storage levels are not predicted to reach the threshold level, O2, as shown in FIG. 5, the throttle may remain closed between $t_8$ and $t_9$, even though the vehicle speed may be less than the desired vehicle speed trajectory.

However, at time $t_9$, a tip-in event may occur, and a vehicle operator may depress the accelerator pedal. As such the desired vehicle speed may increase at $t_9$. In response to the increase in operator commanded torque at $t_9$, the throttle may be adjusted to a more open position, and the fuel injection may be turned on. Due to the initiation of cylinder combustion at $t_9$, the predicted oxygen storage levels may begin to decrease.

Between times $t_9$ and $t_{10}$, the pedal position may continue to be depressed, and as such the vehicle speed may continue to increase. In response to the increase in desired vehicle speed, the throttle position may be held open, and fuel may continue to be injected to the engine cylinders. The position of the throttle and the amount of fuel injected to the engine cylinders may be based on a desired air/fuel ratio, and the desired vehicle speed. The predicted oxygen storage levels may continue to continue to decrease until reaching levels similar to the levels at $t_1$, since the engine may alternate back and forth between running slight lean, and slightly rich, to increase oxidation and reduction reactions of pollutants at the catalyst.

At time $t_{10}$, a tip-out event may occur, and the vehicle operator may stop depressing the accelerator pedal. Thus, the operator commanded torque at $t_{10}$ may decrease below a threshold, and the engine may enter DFSO. As such, fuel injection may be shut off at $t_{10}$. Further, the throttle may be adjusted to the closed first position at $t_{10}$, in response to the initiation of DFSO. Predicted oxygen storage levels may begin to rise at $t_{10}$, since the vehicle speed at $t_{10}$ is relatively high. Thus, because the vehicle speed is sufficiently high at $t_2$, it may be predicted that the duration of the DFSO event may be long enough to cause an increase in the oxygen storage levels of the catalyst.

Between times $t_{10}$ and $t_{11}$, the desired vehicle speed may continue to decrease. Thus, upon entering DFSO at $t_{10}$, the desired vehicle speed may be based on a desired speed trajectory which may be stored in the memory of the controller. As such the desired speed between $t_{10}$ and $t_{11}$ may be based on a desired deceleration rate during DFSO. However, between $t_{10}$ and $t_{11}$, the estimated vehicle speed may decrease faster than the desired speed trajectory. Said another way, the actual vehicle speed may be less than desired. Thus, the engine may be braking more than desired. The predicted oxygen storage levels of the catalyst may continue to increase between $t_{10}$ and $t_{11}$. However since the oxygen storage levels have not reach a threshold level, O2, as shown in FIG. 5, the throttle may remain closed between $t_{10}$ and $t_{11}$.

At time $t_{11}$, the predicted oxygen levels may reach the threshold, O2, and in response to the vehicle speed being below the desired vehicle speed at $t_{11}$, and the predicted oxygen levels reaching the threshold, the throttle may be adjusted to the open second position at $t_{11}$. Opening the throttle may enable more oxygen to flow through the engine, and therefore the predicted oxygen storage level may remain at approximately the threshold, which may be the saturation point of the catalyst, as long as the throttle is open during DFSO. Thus, opening the throttle during DFSO may saturate the catalyst. Fuel injection may remain off, and the desired vehicle speed may continue to decrease according to the desired speed trajectory during DFSO thereby prolonging the DFSO event an improving fuel economy. The pedal position may remain in a tip-out position.

Between times $t_{11}$ and $t_{12}$, the engine may remain in DFSO; the fuel injection may be off, and the pedal position may be in a position that is not depressed. The desired vehicle speed may still remain higher than the estimated vehicle speed, but the difference may decrease due to the opening of the throttle at $t_{11}$. However, between $t_{11}$ and $t_{12}$, the throttle position may be adjusted based on the amount of difference between the desired vehicle speed and the estimated vehicle speed. Thus as the difference between the desired vehicle speed and the estimate vehicle speed continue to decrease between $t_{11}$ and $t_{12}$, the throttle may be proportionally adjusted towards a more closed position, but not to the fully closed first position. The predicted oxygen levels may remain at around O2, and the throttle may remain open.

At time $t_{12}$, a tip-in event may occur, and a vehicle operator may depress the accelerator pedal. As such the desired vehicle speed may increase at $t_{12}$. However, the desired increase in vehicle speed, may be less than the increase in vehicle speed that would result from injecting an amount of fuel according to the current position of the throttle at $t_{12}$, and the desired air/fuel ratio. Thus, because the throttle was open during the DFSO event between $t_{11}$ and $t_{12}$, the throttle position between $t_{11}$ and $t_{12}$ may be a more open position than the desired throttle position corresponding to the operator commanded torque as evidenced by the pedal position at $t_{12}$. Thus, at $t_{12}$, the throttle position may be adjusted to a more closed position that may be the desired throttle position which may bring about an increase in vehicle speed which corresponds to the desired increase in vehicle speed according to the amount of tip-in of the pedal at $t_{12}$. Thus, fuel injection may remain off at $t_{12}$, so as to prevent an over-torque situation. As such, the predicted oxygen storage level may remain around the threshold, O2.

Between times $t_{12}$ and $t_{13}$, the fuel injection may remain off, until mass airflow rates are reduced to a steady state level according to the position of the throttle between $t_{12}$ and $t_{13}$. Thus, the throttle may be maintained in the same desired position as at $t_{12}$, between $t_{12}$ and $t_{13}$. Due to fuel combustion not being initiated between $t_{12}$ and $t_{13}$, the estimated vehicle speed may be lower than the desired vehicle speed. The pedal may continue to be depressed between $t_{12}$ and $t_{13}$. Further, predicted oxygen storage levels may remain at threshold, O2.

While in the example shown in FIG. 5 between $t_{12}$ and $t_{13}$, initiation of fuel injection when exiting DFSO may be delayed, it is important to note that in other examples fuel injection may be initiated in response to a tip-in event regardless of the current airflow rate to the engine. Thus, if the throttle is in an open position during DFSO, fuel injection may be initiated when exiting DFSO in response to a tip-in event (e.g., depression of an accelerator pedal), and may not be delayed. In such examples, spark retard and/or cam timing may be adjusted to reduce torque output when exiting DFSO. Thus, if the torque output is greater than desired when turning on fuel injection in response to a tip-in event, spark timing and/or cam timing may be retarded to reduce the torque output to the desired level.

At time $t_{13}$, the mass airflow rate, may reach the desired rate according to the position of the pedal and desired vehicle speed, and as such fuel injection may be turned on at $t_{13}$. Predicted oxygen storage levels may therefore begin to decrease. The pedal may continue to be depressed, and as such the vehicle speed may continue to increase, however due to initiation of cylinder combustion, the estimated vehicle speed may also begin to increase.

After time $t_{13}$, the pedal position may continue to be depressed, and as such the vehicle speed may continue to increase. In response to the increase in desired vehicle speed, the throttle position may be held open, and fuel may continue to be injected to the engine cylinders. The position of the throttle and the amount of fuel injected to the engine cylinders may be based on a desired air/fuel ratio, and the desired vehicle speed. The predicted oxygen storage levels may continue to decrease.

In this way, over-braking of an engine during DFSO may be reduced. Specifically, by opening a throttle valve during DFSO, a braking torque applied to the engine may be reduced. As such, a technical effect of more closely matching an actual estimated vehicle speed to a desired speed trajectory during DFSO is achieved, by opening the throttle when the vehicle speed decrease below or is anticipated to fall below the desired speed trajectory. Further by maintaining the throttle valve in the open position during DFSO, mass airflow rates through the engine may be maintained at relatively high levels.

In this way, when exiting DFSO due to a tip-in event from a vehicle operator, the increase in operator commanded torque may be more quickly matched by the engine. Thus a second technical effect of increasing the responsiveness of the engine to increases in driver demanded torque is achieved by maintaining the throttle in an open position during DFSO. If the throttle is closed during DFSO, then when exiting DFSO, the throttle may be opened to bring about a corresponding increase in engine torque as requested by the vehicle operator. However, it may take time for the mass airflow rate to increase to levels sufficient to bring about the driver demanded torque. Thus, there may be a lag between actual delivered engine torque, and desired engine torque. However, by maintaining the throttle position open during DFSO, increases in driver demanded torque when exiting DFSO may be achieved more quickly than approaches where the throttle is closed during DFSO.

In this way, responsiveness of the engine may be increased, while the fuel efficiency may not be reduced. Fuel injection may continue to be turned off during DFSO, however the position of the throttle may not be closed. In this way, torque demands may be more accurately and swiftly met, without sacrificing fuel economy.

In one representation, a method may comprise controlling a position of a throttle in an air inlet of an engine propelling a vehicle, in relation to vehicle operator commands, and during a deceleration fuel shut off mode, increasing opening of said throttle independently of said operator commands when speed of said vehicle is or is expected to fall below a desired speed or desired speed trajectory. The method may in some examples further comprise decreasing the throttle opening if the vehicle speed rises above the desired speed or desired speed trajectory during the deceleration fuel shut off mode. The desired speed trajectory may be stored in non-transitory memory of a vehicle controller, where the desired vehicle speed trajectory may be determined based on one or more of the initial speed of said vehicle at commencement of the DFSO mode and an expected duration of the DFSO mode. In some examples, the method may further comprise increasing the opening of the throttle in response to a determination that a temperature of a catalyst coupled to an exhaust of said engine will remain above a threshold during said deceleration fuel shut off mode. Additionally or alternatively, the method may comprise adjusting the throttle to a closed position when entering DFSO mode, and subsequently increasing the opening of the throttle during said DFSO mode. In some examples, the engine may comprise a four stroke engine and increasing the throttle opening may slow a rate of said deceleration to extend operation in the deceleration fuel shut off mode. The method may the increasing the opening of the throttle may be based on a difference between the desired speed of the vehicle and the speed of the vehicle, and where an amount of increase in the opening of the throttle may increase for increases in the difference between the desired speed of the vehicle and the speed of the vehicle. Deceleration shut off mode may end upon one or more of the following events: the speed of said engine has decreased below a threshold and an idle speed control mode commences; or, said operator commands an increase in power. In still further examples, the method may comprise initiating fuel injection when said deceleration fuel shut off mode ends, and retarding a spark timing from a set point in response to engine torque exceeding a desired engine torque level, where the desired engine torque level may be determined based on vehicle operator commands. Camshaft timing may be adjusted in some examples via a variable cam timing (VCT) system during the deceleration fuel shut off mode, so that a closing time of an intake valve of a combustion cylinder of said engine may be adjusted to a later point in a compression stroke of a piston in said cylinder. Alternatively, the camshaft timing may be adjusted via a variable cam timing (VCT) system during the deceleration fuel shut off mode, so that a closing time of an intake valve of a combustion cylinder of said engine is adjusted to an earlier point in an intake stroke of a piston in said cylinder. The desired speed trajectory may be based on the speed of the vehicle at an initiation of deceleration fuel shut off and a desired deceleration rate.

In another representation, a method may comprise controlling a position of a throttle, in an air inlet of an engine propelling a vehicle, in relation to vehicle operator commands; and during a deceleration fuel shut off mode, increasing an opening of said throttle independently of said operator commands in response to an indication that a temperature of a catalyst coupled to an exhaust of said engine will remain above a threshold during said deceleration fuel shut off mode. The method may further comprise closing the opening of said throttle in response to the speed of said vehicle increasing above the desired speed trajectory. The method may additionally or alternatively comprise maintaining the position of the throttle during deceleration fuel shut off in response to the speed of said vehicle reaching the desired speed trajectory. The method may additionally or alternatively comprise initially closing said throttle upon initiation of said deceleration fuel shut off mode to extend time before the temperature of said catalyst will reach said threshold. In some examples, the method may additionally or alternatively comprise determining whether the temperature of said catalyst will reach the threshold during said deceleration fuel shut off mode based on one or more of a temperature of the catalyst at initiation of said deceleration fuel shut off mode, a position of the throttle, and an estimated tip-out duration. The vehicle operator commands may comprise inputs from a vehicle operator via an accelerator pedal. In some examples, the method may additionally include, when exiting deceleration fuel shut off mode, not injecting fuel to cylinders of said engine when a mass airflow rate in the engine is greater than a desired mass airflow rate, where the desired mass airflow rate may be determined based on vehicle operator commands and a desired air/fuel ratio. In other examples, the method may include, when exiting deceleration fuel shut off mode, injecting fuel to cylinders of said engine, and in response to a mass airflow rate in the engine being greater than a desired mass airflow rate, retarding a spark timing from a set point, where the desired mass airflow rate is determined based on vehicle operator commands and a desired air/fuel ratio.

In another representation, a system may comprise a four stroke combustion engine, a throttle positioned in an engine intake of the engine for regulating airflow to engine cylinders of the engine, an input device configured to generate an output corresponding to an operator commanded torque, and a controller with computer readable instructions. The computer readable instructions may include instructions for: during a deceleration fuel shut off mode, increasing an opening of the throttle independently of the operator commanded torque in response to an indication a vehicle speed is or is expected to fall below a desired speed trajectory; and otherwise controlling the position of a throttle in relation to the operator commanded torque. In some examples, the system may further comprise a three-way exhaust catalyst, where the catalyst may be configured to temporarily store oxygen, and where the computer readable instructions further include instructions for decreasing the opening of the throttle during deceleration fuel shut off mode when the oxygen storage capacity of the catalyst is predicted to fall below a threshold. The computer readable instructions may in some examples, further include instructions for delaying fuel injection the engine cylinders when exiting deceleration fuel shut off mode when a mass airflow rate in the engine is greater than a desired mass airflow rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, O-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
controlling a position of a throttle, in an air inlet of an engine propelling a vehicle, in relation to vehicle operator commands; and
during a deceleration fuel shut off (DFSO) mode, adjusting an opening of said throttle independently of said vehicle operator commands to maintain a speed of said vehicle at a desired speed or desired speed trajectory, wherein the adjusting comprises increasing the opening of said throttle when said vehicle speed is or is expected to fall below the desired speed or desired speed trajectory, and decreasing the opening of said throttle when said vehicle speed is or is expected to rise above said desired speed or desired speed trajectory during said DFSO mode; and
when exiting the DFSO mode and resuming fuel injection:
retarding a spark timing in response to an intake mass airflow rate exceeding a desired intake mass airflow rate, where the desired intake mass airflow rate is determined based on the vehicle operator commands.

2. The method recited in claim 1, further comprising increasing the opening of said throttle in response to a determination that a temperature of a catalyst coupled to an exhaust of said engine will remain above a threshold during said DFSO mode.

3. The method recited in claim 1, further comprising adjusting the throttle to a closed position when entering the DFSO mode, and subsequently increasing the opening of the throttle during said DFSO mode.

4. The method recited in claim 1, wherein said engine comprises a four stroke engine and said increasing said throttle opening decreases engine braking and therefore slows a rate of said deceleration to extend operation in said DFSO mode.

5. The method recited in claim 1, wherein the increasing the opening of the throttle is based on a difference between the desired speed of the vehicle and the speed of the vehicle, and where an amount of increase in the opening of the throttle increases for increases in the difference between the desired speed of the vehicle and the speed of the vehicle.

6. The method recited in claim 1, wherein said DFSO mode ends upon one or more of the following events: the speed of said engine has decreased below a threshold and an idle speed control mode commences; or, an operator commands an increase in power.

7. The method recited in claim 1, further comprising adjusting a camshaft timing via a variable cam timing (VCT) system during the DFSO mode, so that a closing time of an intake valve of a combustion cylinder of said engine is adjusted to a later point in a compression stroke of a piston in said cylinder.

8. The method recited in claim 1, further comprising adjusting a camshaft timing via a variable cam timing (VCT) system during the DFSO mode, so that a closing time of an intake valve of a combustion cylinder of said engine is adjusted to an earlier point in an intake stroke of a piston in said cylinder.

9. The method recited in claim 1, wherein the desired speed trajectory is based on the speed of the vehicle at an initiation of mode and an estimated tip-out duration.

10. A method comprising:
controlling a position of a throttle, in an air inlet of an engine propelling a vehicle, in relation to vehicle operator commands; and
during a deceleration fuel shut off mode, increasing an opening of said throttle independently of said vehicle operator commands in response to an indication that a temperature of a catalyst coupled to an exhaust of said engine will remain above a threshold during said deceleration fuel shut off mode with the throttle open; and
when exiting the deceleration fuel shut off mode, injecting fuel to cylinders of said engine, and in response to a mass airflow rate in the engine being greater than a desired mass airflow rate due to said increased throttle opening, retarding a spark timing from a set point, where the desired mass airflow rate is determined based on the vehicle operator commands and a desired air/fuel ratio.

11. The method recited in claim 10, further comprising closing the opening of said throttle in response to a speed of said vehicle increasing above a desired speed trajectory.

12. The method recited in claim 10, further comprising initially closing said throttle upon initiation of said deceleration fuel shut off mode to extend time before the temperature of said catalyst will reach said threshold.

13. The method recited in claim 12, further comprising determining whether the temperature of said catalyst will reach the threshold during said deceleration fuel shut off mode based on one or more of a temperature of the catalyst at initiation of said deceleration fuel shut off mode, a position of the throttle, and an estimated tip-out duration.

14. The method recited in claim 10, further comprising, when exiting the deceleration fuel shut off mode, not injecting fuel to cylinders of said engine when the mass airflow rate in the engine is greater than the desired mass airflow rate, where the desired mass airflow rate is determined based on the vehicle operator commands and the desired air/fuel ratio.

15. A system comprising:
a four stroke combustion engine;
a throttle positioned in an engine intake of the engine for regulating airflow to engine cylinders of the engine;
an input device configured to generate an output corresponding to an operator commanded torque; and
a controller with computer readable instructions for:

during a deceleration fuel shut off mode, increasing an opening of the throttle independently of the operator commanded torque in response to an indication a vehicle speed is or is expected to fall below a desired speed trajectory; otherwise controlling the position of the throttle in relation to the operator commanded torque; and delaying fuel injection to the engine cylinders when exiting the deceleration fuel shut off mode when a mass airflow rate in the engine is greater than a desired mass airflow rate.

16. The system of claim 15, further comprising a three-way exhaust catalyst, where the catalyst is configured to temporarily store oxygen, and where the computer readable instructions further include instructions for decreasing the opening of the throttle during the deceleration fuel shut off mode when an oxygen storage capacity of the catalyst is predicted to fall below a threshold.

* * * * *